(12) United States Patent
Inoue et al.

(10) Patent No.: US 8,995,091 B2
(45) Date of Patent: Mar. 31, 2015

(54) MAGNETIC HEAD FOR THERMALLY ASSISTED MAGNETIC RECORDING

(71) Applicant: HGST Netherlands B.V., Amsterdam (NL)

(72) Inventors: Tomomitsu Inoue, Odawara (JP); Hideo Yamakura, Yokohama (JP); Hidetoshi Anan, Yokohama (JP); Hiroshi Ishizaki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/725,545

(22) Filed: Dec. 21, 2012

(65) Prior Publication Data

US 2014/0177406 A1 Jun. 26, 2014

(51) Int. Cl.
*G11B 21/02* (2006.01)
*G11B 5/48* (2006.01)
*G11B 5/60* (2006.01)
*G11B 5/31* (2006.01)
*G11B 5/10* (2006.01)
*G11B 5/00* (2006.01)

(52) U.S. Cl.
CPC .............. *G11B 5/3163* (2013.01); *G11B 5/102* (2013.01); *G11B 5/3173* (2013.01); *G11B 2005/0021* (2013.01)
USPC .................. 360/236.5; 360/234.4; 360/234.7; 360/234.8; 360/123.1; 360/234.5

(58) Field of Classification Search
None
See application file for complete search history.

(56) References Cited

U.S. PATENT DOCUMENTS

| | | | |
|---|---|---|---|
| 4,789,914 A | 12/1988 | Ainslie et al. | |
| 5,200,869 A | 4/1993 | Matsuzaki | |
| 5,610,783 A | 3/1997 | Maffitt et al. | |
| 7,126,792 B2 * | 10/2006 | Bonin et al. | 360/234.7 |
| 7,446,977 B2 | 11/2008 | Nikitin et al. | |
| 7,535,676 B2 | 5/2009 | Lille | |
| 7,929,248 B2 | 4/2011 | Zhu et al. | |
| 8,418,353 B1 * | 4/2013 | Moravec et al. | 29/603.16 |
| 2001/0048573 A1 * | 12/2001 | Kawai et al. | 360/234.5 |
| 2003/0161069 A1 * | 8/2003 | Hipwell et al. | 360/234.5 |
| 2005/0083611 A1 * | 4/2005 | Shum et al. | 360/245.8 |
| 2006/0203387 A1 * | 9/2006 | White et al. | 360/234.5 |
| 2007/0047144 A1 * | 3/2007 | Oosawa | 360/234.5 |
| 2008/0170326 A1 * | 7/2008 | Feng et al. | 360/99.04 |
| 2009/0052078 A1 | 2/2009 | Tanaka et al. | |
| 2009/0195930 A1 | 8/2009 | Lille | |
| 2011/0019310 A1 * | 1/2011 | Yao et al. | 360/234.5 |

(Continued)

FOREIGN PATENT DOCUMENTS

| | | |
|---|---|---|
| JP | 5234049 A | 9/1993 |
| JP | 07/32705 | 6/1995 |

(Continued)

*Primary Examiner* — Wayne Young
*Assistant Examiner* — Dionne Pendleton
(74) *Attorney, Agent, or Firm* — Zilka-Kotab, PC

(57) ABSTRACT

A slider for magnetic data recording in a thermally assisted recording system. The slider has a slider body and a magnetic recording head formed on a trailing edge of the slider body. A first terminal is formed on a trailing edge surface of the recording head, and a second terminal is formed on a backside surface both the magnetic recording head and the slider body so as to extend across both the magnetic recording head and the slider body. An electrically conductive lead formed within the magnetic recording head connects the first lead with the second lead.

21 Claims, 15 Drawing Sheets

(56) References Cited

U.S. PATENT DOCUMENTS

2011/0019311 A1* 1/2011 Greminger et al. ........ 360/234.5
2012/0287530 A1* 11/2012 Inoue et al. .................... 360/75

FOREIGN PATENT DOCUMENTS

| WO | 2009/096014 A1 | 8/2009 |
| WO | 2009/147732 A1 | 12/2009 |

* cited by examiner

MAGNETIC HEAD FOR THERMALLY ASSISTED MAGNETIC RECORDING

FIELD OF THE INVENTION

The present invention relates to magnetic data recording and more particularly to a magnetic head for thermally assisted recording that has an improved electrical connection to a laser diode for heating of a magnetic media.

BACKGROUND OF THE INVENTION

Many computer devices and data servers include an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor or a Tunnel Junction Magnetoresisive (TMR) sensor has traditionally been employed to read a magnetic signal from the magnetic media. The magnetoresistive sensor has an electrical resistance that changes in response to an external magnetic field. This change in electrical resistance can be detected by processing circuitry in order to read magnetic data from the adjacent magnetic media.

As the need for increased data density increases, the size of magnetic bits recorded on a media must become ever smaller. This in turn can require smaller magnetic grains. However, as the size of the magnetic bits and the associate size of magnetic grains on the magnetic media shrink, the recorded bits can become magnetically unstable. This can be overcome by constructing a magnetic recording system as a thermally assisted magnetic recording system. Such as system uses a magnetic medium that has a high coercivity at room temperature, but a lower coercivity at elevated temperatures. A heat source such as a laser can be used to locally heat the media immediately prior to recording, which temporarily lowers the coercivity of the media so that data can be written. After the data is written the media cools and the data is magnetically stable.

SUMMARY OF THE INVENTION

The present invention provides a magnetic recording slider that includes a slider body having an air bearing surface a backside surface opposite the air bearing surface and a trailing edge surface and having a head formed on the trailing edge surface. The head has a trailing edge surface and a backside surface as well. An electrically conductive first terminal is formed on the trailing edge surface of the head, and an electrically conductive second terminal is formed on the backside surface of the head and the backside surface of the slider body. An electrical lead is formed within the head and connects the electrically conductive first terminal with the electrically conductive second terminal.

The slider can be constructed by a method that includes forming a slider row having a backside surface and having a recording head formed on a trailing edge surface of the slider row. The recording head has a trailing edge surface and a backside surface, and has an electrically conductive first terminal formed on the trailing edge surface of the recording head, and has an electrical lead line connected with the first terminal and extending through the recording head to the back side surface of the recording head. A photoresist mask can be formed on the backside surfaces of the slider body and recording head, the photoresist being formed with an opening configured to define a second terminal pattern that extends over a portion of the slider body and a portion of the recording head. An etching is performed, and an electrically conductive material is deposited to form a second terminal on the backside surfaces of both the slider body and recording head.

Both the first and second terminals can be constructed of Au. The second terminal can be used to electrically connect with a light source such as a laser diode for providing laser light for heating the magnetic medium immediately prior to writing of data. Because the second terminal extends across both the magnetic head and the slider body, it can be formed with a substantially larger surface area than would be possible if it were only formed on the magnetic head. This greatly facilitates the electrical connection with the light source, such as by soldering.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
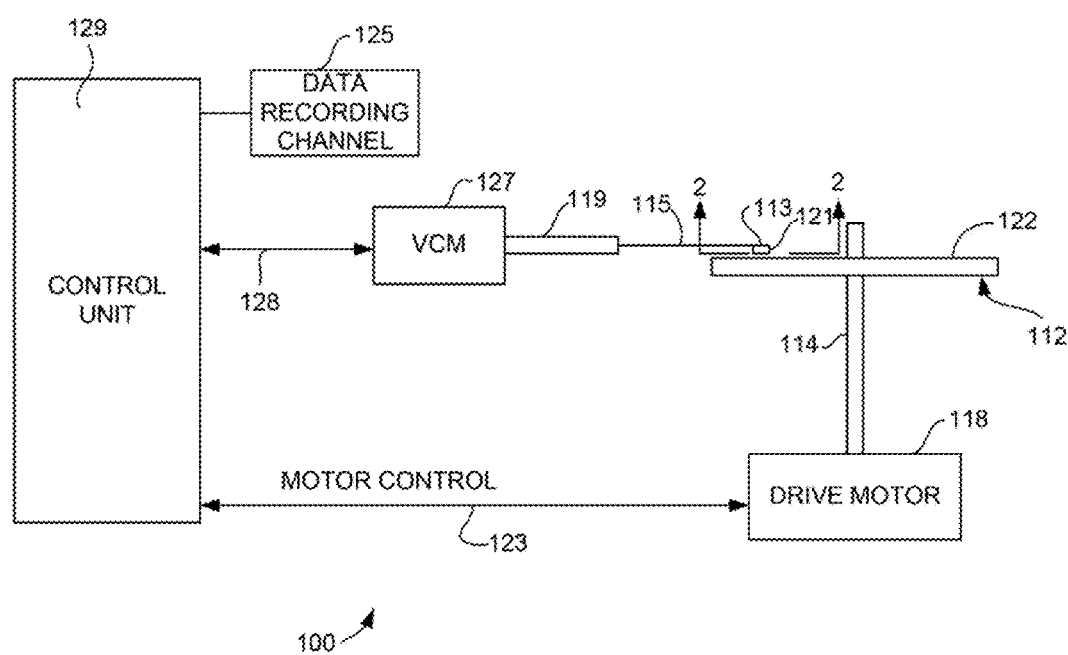
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2A:
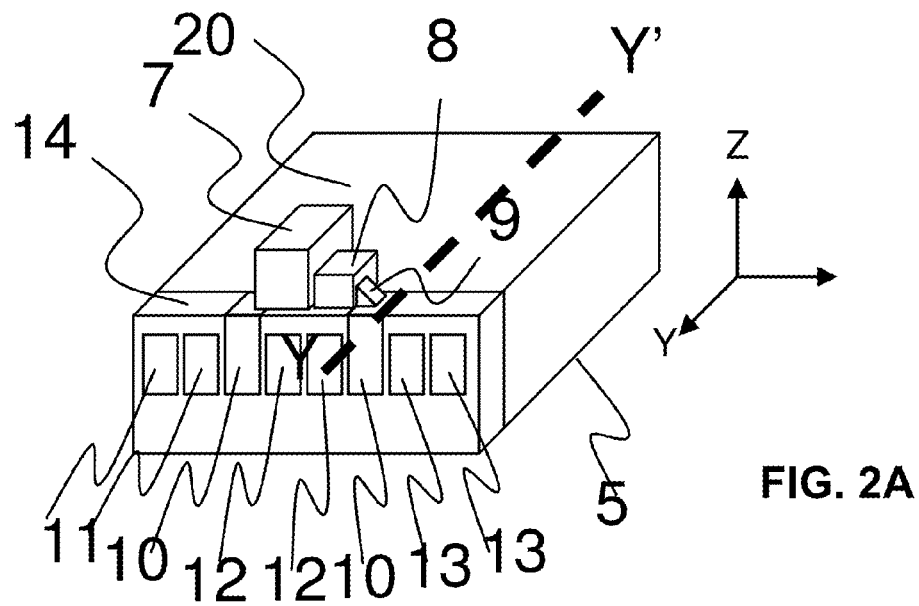
FIGS. 2A and 2B show two perspective views of a magnetic slider as can be used in the disk drive system of FIG. 1.
Figure 2B:
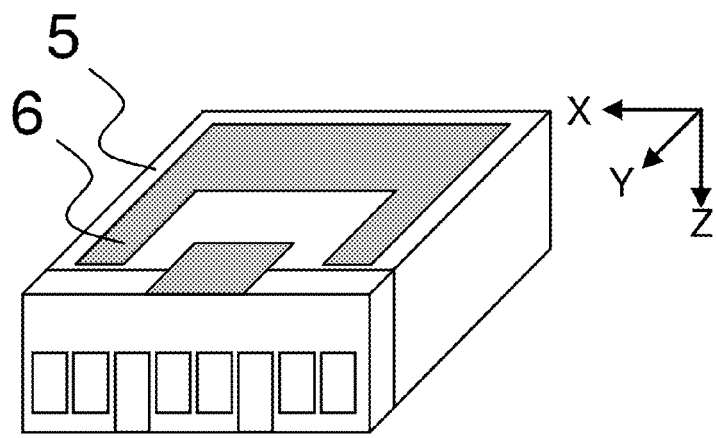
Figure 3:
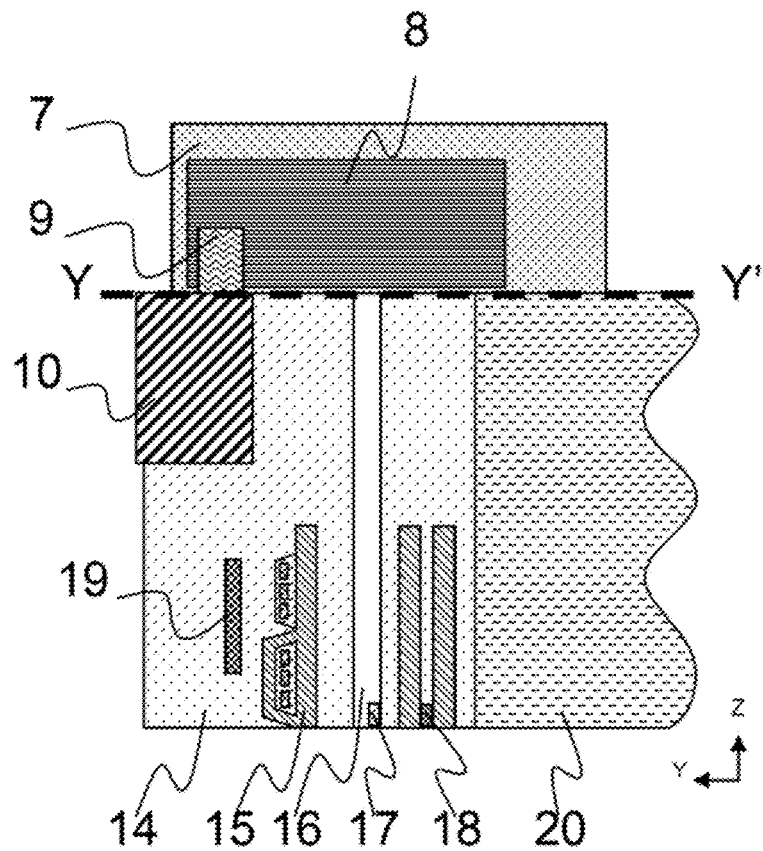
FIG. 3 is cross sectional view of the slider of FIG. 2 as seen from line Y-Y of FIG. 2.

FIGS. 2A and 2B are diagrams of the thermally-assisted magnetic recording head slider 20. FIG. 3 shows a cross-sectional view in the taken along line Y-Y of FIG. 2. As shown in FIG. 2, the thermally-assisted magnetic recording head slider has a read element 18, a write element 15, and a heater element 19 formed on the end surface of a slider 20 composed of AlTiC. In addition, a waveguide 16 and a near-field light emitting element 17, needed to heat the magnetic disk 112, are formed in the vicinity of the write element 15. A light source unit that includes a sub-mount 7 and a laser oscillator 8 is mounted on a back surface of the thermally-assisted magnetic recording head slider 20. Laser light from the light source unit irradiates the near-field light emitting element 17 through the waveguide 16. Electrically conductive studs or terminals are formed on and embedded in the head, and provide electrical connection with the light source unit. Electrically conductive terminals 11 are connected with the read element 18. Electrically conductive terminals 12 are connected with the write element 15, and electrically conductive terminals 13 connected with the heater element 19 are on the side surface of the thermally-assisted magnetic recording head slider. A protective film 14 composed of alumina ($Al_2O_3$) is formed to protect all of the elements. In addition, on an air-bearing surface 5 which is the surface opposite the magnetic disk of the thermally-assisted magnetic recording head slider, an air-bearing surface topography such as a rail 6 is formed by dry etching, such as ion milling. A method for manufacturing a slider as described above with reference to FIGS. 2 and 3 can include the following steps:

1) The read element 18, the write element 15, the heater element 19, the waveguide 16, and the near-field light emitting element 17 are formed on the slider 20 by using a thin-film process such as plating, sputtering, and polishing. The body of the slider 20 can be constructed of AlTiC.

2) Alumina 14, which is the protective film, is formed by sputtering to cover the above elements.

3) Through-holes are formed on the protective film. The gold studs 10 that become the gold terminals on the trailing edge surface and the backside surface are formed from Au, Ag, Cu, or NiFe to connect the elements and the gold terminals 11-13.

4) A grinding process using a cutting stone cuts the above slider 20 into row bars of several tens of aligned thermally-assisted magnetic recording head sliders.

5) A final finishing and polishing process is applied to the air-bearing surface 5, which is the surface opposite the magnetic disk of the row bar.

6) In order for the thermally-assisted magnetic recording head slider to fly on the order of nanometers in the HDD, the air-bearing surface topography 6 is formed by dry etching, such as ion milling, on the air-bearing surface 5 of the row bar.

7) A cutting process is used to divide the row bars into individual thermally-assisted magnetic recording head sliders.

8) The light source unit comprised of a mount 7 and a laser oscillator 8 is installed on the back surface of the thermally-assisted magnetic recording head slider, and the gold studs 10 and the wires of the light source unit are electrically connected by solder 9.

FIGS. 4 to 7 are flow charts illustrating methods for manufacturing a magnetic head according to possible embodiments of the invention. FIGS. 8-15 illustrate slider rows in various intermediate stages of manufacture, illustrating sliders according to various embodiments of the invention and methods for manufacturing sliders according to various embodiments of the invention.

Embodiment 1

FIGS. 8 and 9 show a slider row in various stages of manufacture illustrating a method of manufacturing a slider according to one possible embodiment of the invention. FIG. 8 shows a perspective view of a row of sliders 20, and FIG. 9 shows a side cross section view of the row of sliders 20. With particular reference to FIGS. 8A and 9A, the row of sliders 20 is shown having a recording head 14 on its trailing edge and having trailing edge surface terminals 10 that are provided to supply power to the light source unit (not yet formed) on the back-side surface of the thermally-assisted magnetic sliders 20.

Figure 8A:
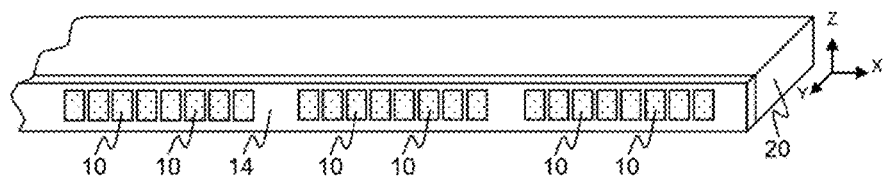
FIGS. 8A-8D and 9A-9D show a slider row in various intermediate stages of manufacture according to an embodiment of the invention.
Figure 8B:
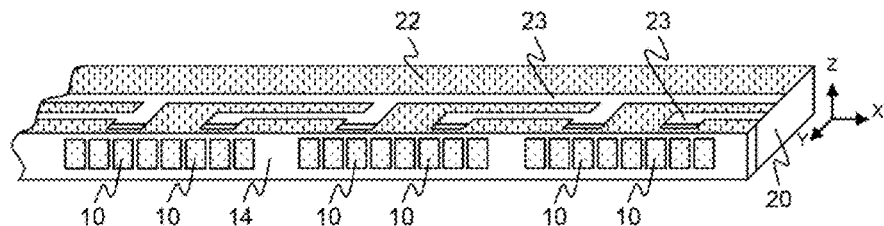

Electrical lead lines 21 are formed within the head 14 for electrically connecting the side surface terminals 10 and the terminals 25 (FIGS. 8D, 9D) on the back surface of the thermally-assisted magnetic recording head slider 20. The electrical lead lines 21 can be formed of a material having a low electrical resistance such as Au, Ag, Cu, NiFe and their alloys, and can be formed by lithographic and deposition processes during the fabrication of the head 14. In this embodiment, after the wafer is cut into the row of sliders 20 as shown in FIGS. 8 and 9, and the back surface is polished, terminals 25 are formed on the back surface of the row bar. Initially, as shown in FIGS. 8B and 9B, a resist 22 is coated on the back surface of the slider 20, and a terminal pattern 23 is formed by photolithography. The coating resist 22 may be either a negative resist or a positive resist. However, the film thickness of the resist 22 must be able to withstand etching because dry etching is conducted in the post-process. For example, the thickness must be approximately 50 µm. In addition, the shape of the gold terminal pattern 23 is not limited to the specific configuration shown.

After the gold terminal pattern 23 is formed by photolithography, dry etching (i.e. reactive ion etching) is conducted, with the photoresist 22 as a mask to etch into the alumina head 14 and slider 20 as shown in FIGS. 8B and 9B. For example, reactive ion etching (RIE) can be used to etch approximately 30 µm into the head 14 and slider 20. In this example, dry etching is conducted so that satisfactory adhesion can be ensured between the slider 20 and the gold terminal ground film 24. However, dry etching does not have to be conducted when satisfactory adhesion can be ensured between the slider 20 and the gold terminal ground film 24.

Figure 8C:
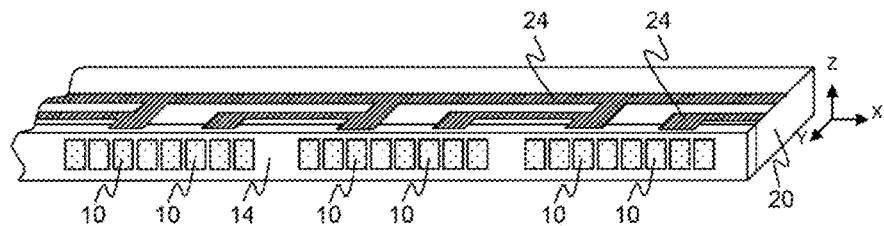
Figure 9A:
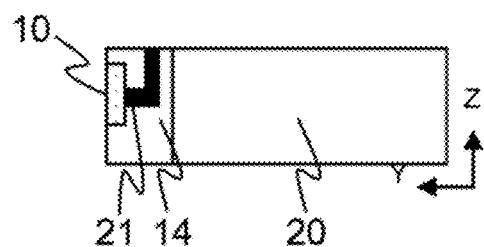
Figure 9B:
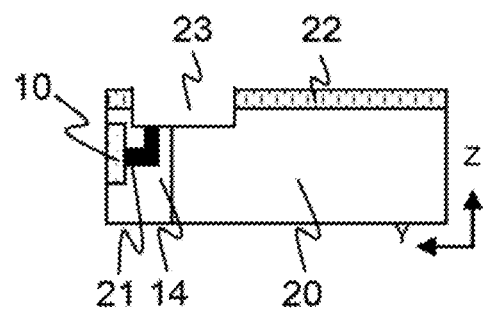
Figure 9C:
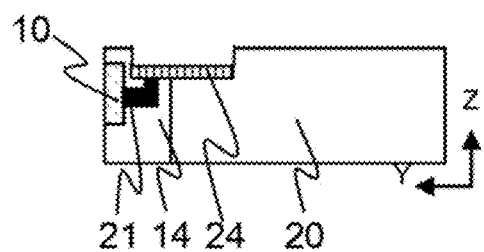

As shown in FIGS. 8C and 9C, the terminal ground film 24 is fabricated, and the resist 22 is removed. The composition and structure of the terminal ground film 24 are not particularly specified, but, for example, a metal film such as Cr, NiFe, Au, etc. is preferably grown by vacuum deposition to a film of approximately 300 nm. The removal method is not particularly restricted, but preferably, a lift-off process submerges the row bar for a specified time in, for example, a special resist removal fluid to remove with the gold terminal ground film on the resist.

Figure 8D:
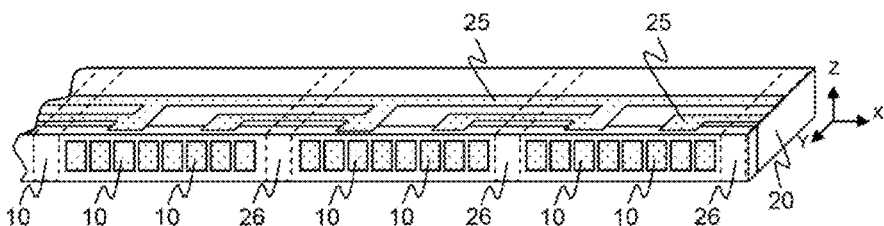
Figure 9D:
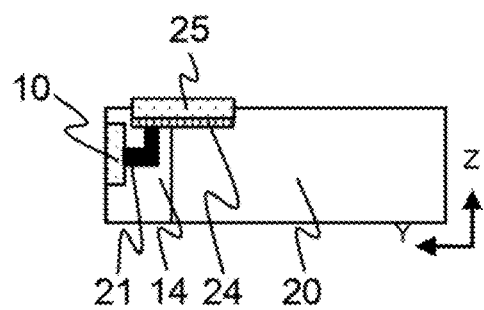

After the ground film 24 has been deposited, an electroplating process can be performed to electroplate a terminal 25 on the ground film 24 as shown in FIGS. 8D, 9D. The terminals 25 are preferably constructed of electroplated Au. The ground film 24 is used as an electroplating seed so that the film 25 grows only on the ground layer 24 and not elsewhere on the back side of the slider 20. As can be seen, the ground layer 24 is interconnected between various sliders of the row of sliders 20. Therefore, the number of wires for electroplating that connect to the row bar can be reduced, and electroplating can be facilitated.

After the terminals 25 have been formed, a slicing operation is performed to divide the row of sliders 20 into individual slider bodies. As shown in FIG. 8D, the slicing operation cuts the row at cut locations 26. A portion of the wires connecting the gold terminals is also simultaneously cut, and the terminals 25 can be used as the terminals for supplying power to the light source unit. The composition of the electroplated film 25 in the top surface layer of the terminals 25 is not particularly limited, but in the post-process, the wires of the light source unit and the back surface gold terminals 25 are electrically connected by solder, therefore, solder wetting should be considered.

Figure 4:
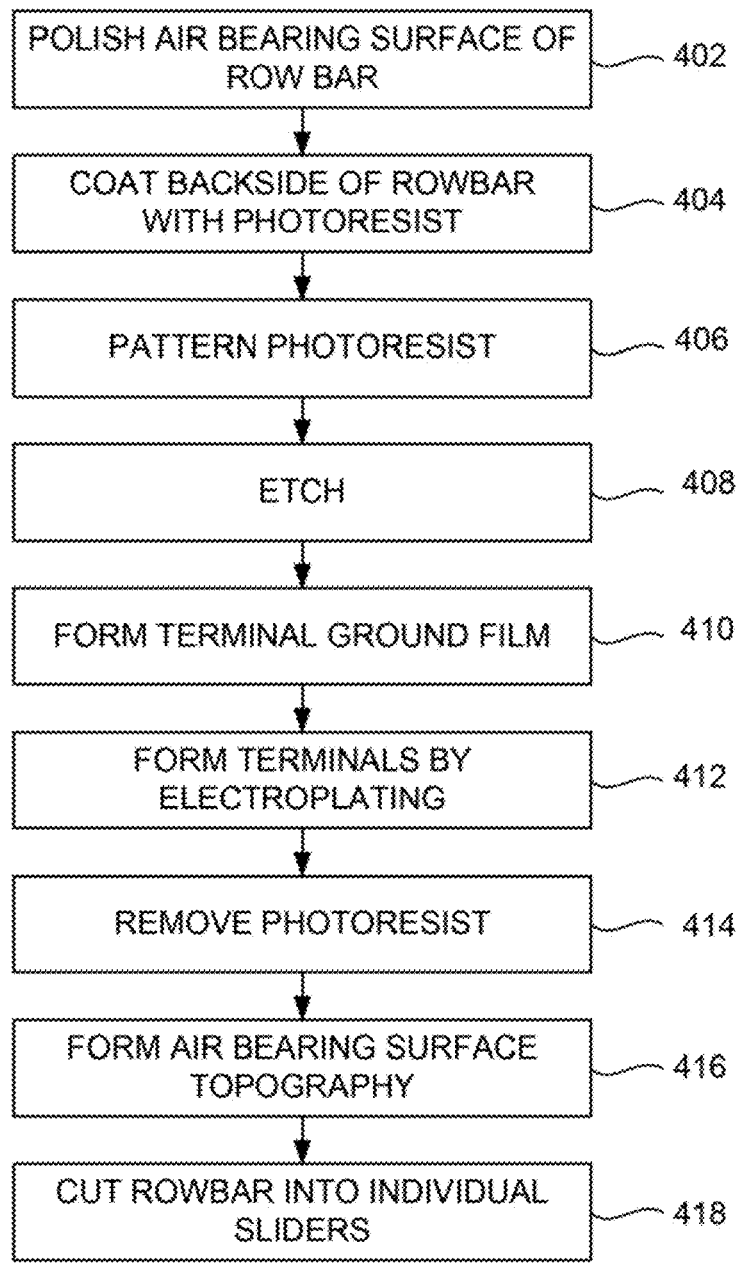
FIGS. 4-7 are flowcharts summarizing methods of manufacturing a slider according to various embodiments of the invention.

The above described process can be summarized with reference to the flowchart of FIG. 4. First in a step 402 after the magnetic head 14 is formed on (on a wafer with thousands of heads) the wafer is sliced into rows of wafers. The air bearing surface of the wafer row is polished to form the row of sliders 20 described above with reference to FIGS. 8A and 9A.

Then, in a step 404 a layer of photoresist 22 (FIGS. 8B, 9B) is deposited, and in a step 406 the photoresist is photolithographically patterned as described above with reference to FIGS. 8B, 9B. Then, in a step 408 an etching process is performed with the photoresist mask 22 in place to define a terminal pattern 23 (FIGS. 8B, 9B).

In a step 410 an electrically conductive material is deposited with the photoresist mask 22 in place to form a terminal ground 24 (FIGS. 8C, 9C). As discussed above this electrically conductive material can be Cr, NiFe, Au or an alloy thereof and can be deposited by vapor deposition. Then, in a step 412 the terminals 25 are electroplated as shown in FIGS. 8D, 9D, using the ground 24 as an electroplating seed layer. As discussed above, the terminals 25 are preferably Au.

With the terminals 25 formed as described above, in a step 414 the photoresist is removed. This leaves a structure as shown in FIGS. 8D and 9D. Then, in a step 416 the topography of the air bearing surface can formed by masking and etching or ion milling the air bearing surface of the slider row 20 to form it with one or more rails and/or pads for each of the sliders to optimize the aerodynamics of the slider over the media. Then, in a step 418, the slider row 20 can be cut into individual sliders.

Embodiment 2

Figure 5:
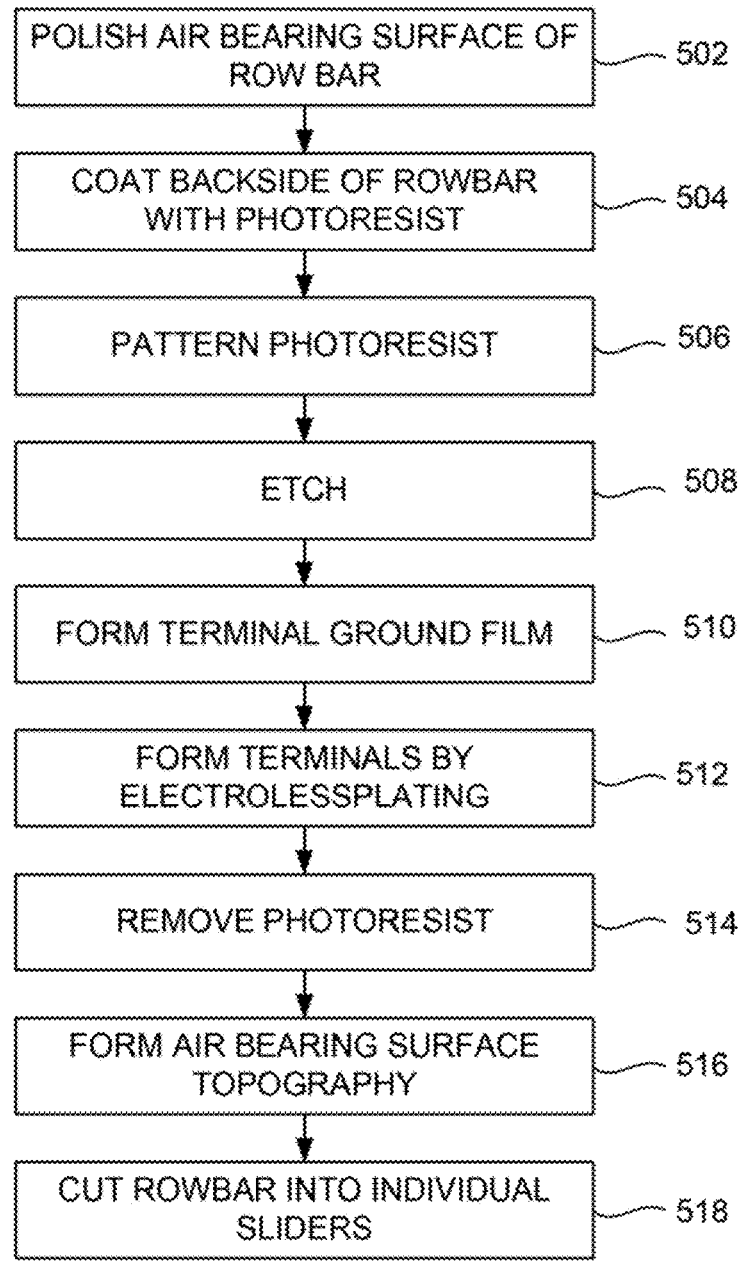

FIGS. 10 to 11 and the flow chart of FIG. 5 illustrate a method of manufacturing a magnetic slider according to another embodiment of the invention. The process begins with a slider 20 as shown in FIGS. 10A and 11A, which is substantially the same as the slider 20 of FIGS. 8A and 9A. A characteristic of this embodiment is that after the wafer is cut into row bars and the back surfaces are polished, electroless plating is applied to the back surface of the thermally-assisted magnetic recording head slider to form the gold terminals 25. Similar to the above example, the side surface terminals 10 for supplying power to the light source unit have the same structure in order to simultaneously fabricate the gold terminals provided on the backside surface. In addition, lead lines 21 for electrically connecting the side surface terminals 10 with the gold terminals 25 on the backside surface of the thermally-assisted magnetic recording head slider can be constructed of, for example, Au, Ag, Cu, NiFe which have small electrical resistance, or their alloys, and are formed with the elements formed on the slider 20.

Figure 10A:
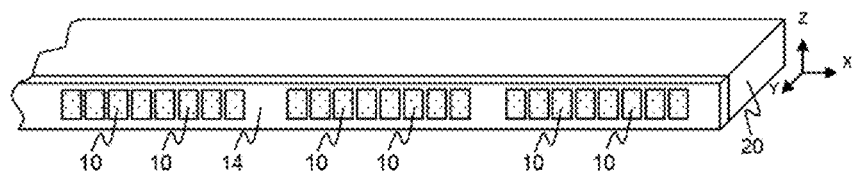
FIGS. 10A-10D and 11A-11D show a slider row in various intermediate stages of manufacture according to an alternate embodiment of the invention.
Figure 10B:
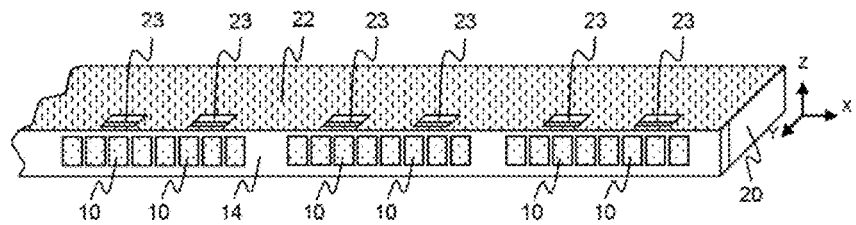
Figure 10C:
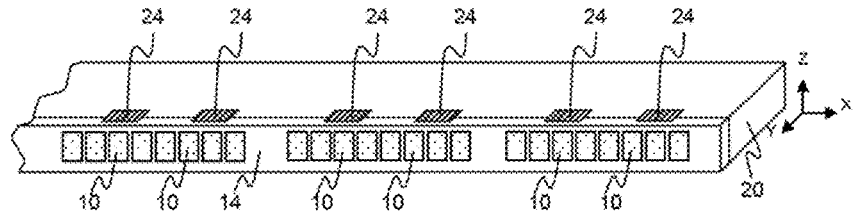
Figure 11A:
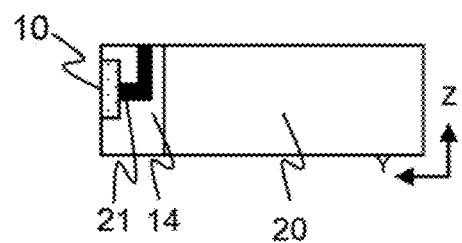
Figure 11B:
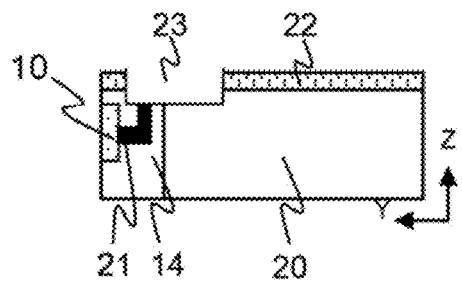
Figure 11C:
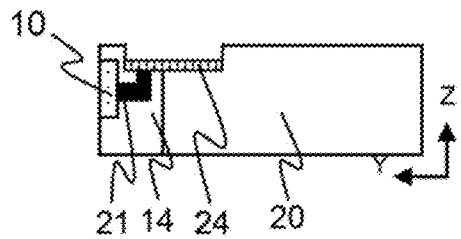

As shown in FIGS. 10B, 11B, a resist 22 is coated on the back-side surface of the thermally-assisted magnetic recording head slider, and the terminal pattern 23 is formed by photolithography. The resist used may be either a negative resist or a positive resist as in working example 1. However, because dry etching is performed in the post-process, the film thickness of the resist 22 must be able to withstand etching and, for example, must be approximately 50 µm. The shape of the terminals and the gold terminal pattern 23 are not limited to the working examples in this specification. Preferably, the etching method is, for example, reactive ion etching (RIE) and etches approximately 30 µm. However, the etching method is not particularly restricted. As shown in FIGS. 10C and 11C the gold terminal ground film 24 is grown, and the resist 22 is removed. In this example, because electroless plating is applied to the top of the terminal ground film 24 to form the terminals 25 in the next process, the top surface of the ground film is preferably formed by electroless nickel plating. However, the composition, structure, and film deposition method of the ground are not particularly limited if electroless gold plating is applied. In addition, because electroless plating is used for patterning, current does not have to flow in the gold terminal ground film 24 as in the previously described embodiment. Therefore, wires do not have to be provided between the terminals 25. In addition, if there are no problems with the adhesive strength of the gold terminal ground film 24, etching need not be conducted, and, a catalyst such as tin or palladium can be supported by the slider 20 to conduct electroless nickel plating. In this case, the composition of the electroless nickel plated film is not particularly limited if the leads 21 have a sufficiently low electrical resistance. After the gold terminal ground film 24 is deposited, the ground film deposited on the resist 22 is removed with the resist. For example, the removal method is preferably a lift-off process that submerges the row bars for the specified time in a special resist removal fluid to remove the resist with the gold terminal ground film on the resist.

Figure 10D:
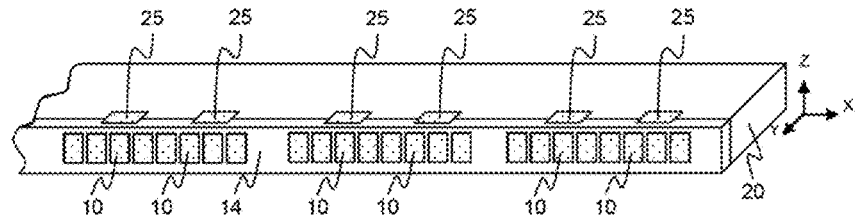
Figure 11D:
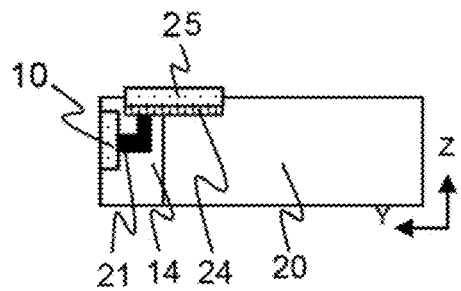
Figure 12A:
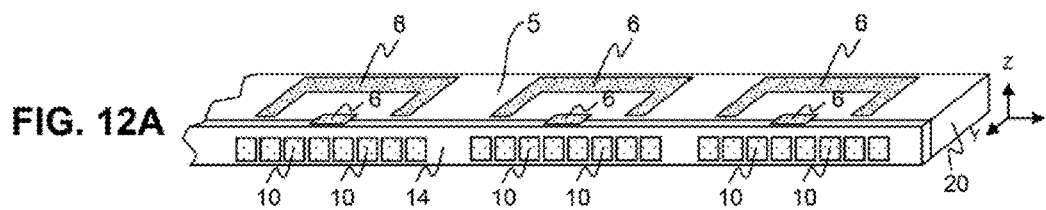
FIGS. 12A-12D and 13A-13D show a slider row in various intermediate stages of manufacture according to another embodiment of the invention.
Figure 12B:
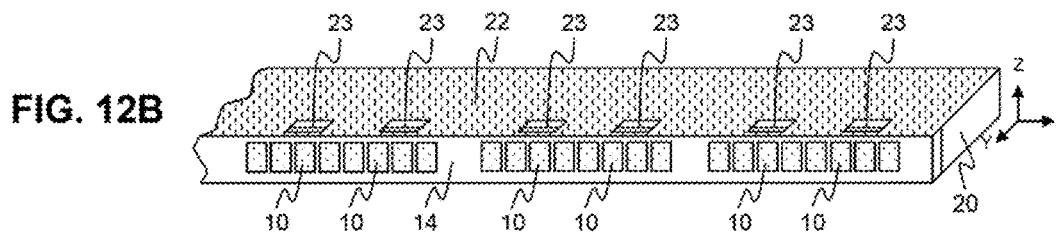
Figure 12C:
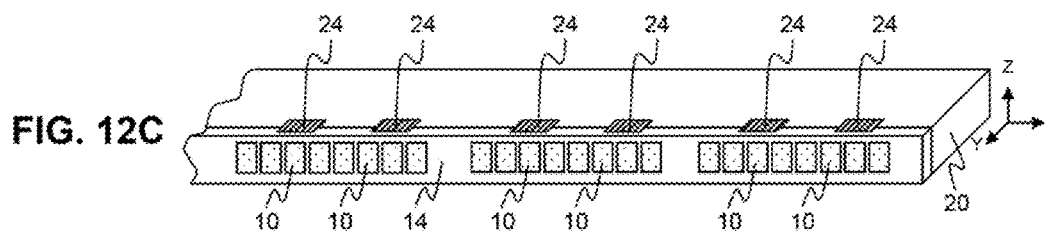
Figure 12D:
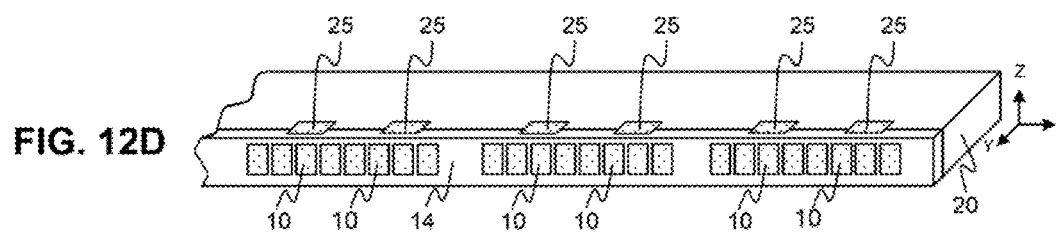
Figure 13A:
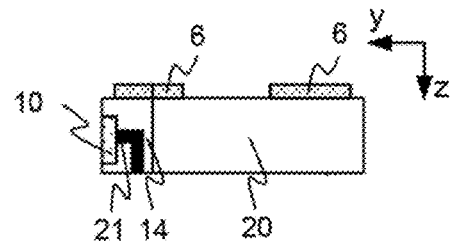
Figure 13B:
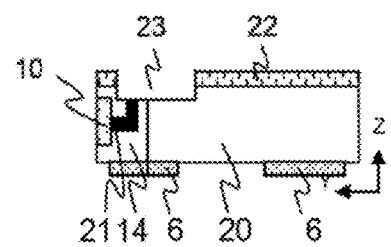
Figure 13C:
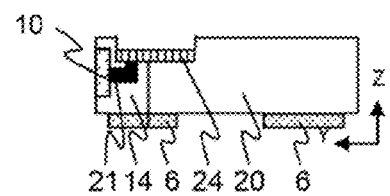
Figure 13D:
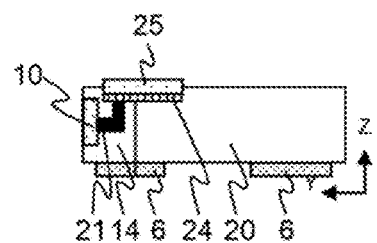

Then, as shown in FIGS. 10D and 11D, electroless plating is applied to the top of the ground film 24 to form the terminals 25 which are preferably gold. For example, displacement plating of the ground film is used in the electroless gold plating to apply electroless gold plating to plate approximately 0.5 μm. The composition of the electroless gold plating is not particularly limited, but solder wetting is a consideration, because the wires of the light source unit and the back surface terminals 25 are electrically connected by solder in the post-process.

The process described above with reference to FIGS. 10 and 11 can be summarized with reference to the flowchart of FIG. 5. In a step 502 the row of sliders 20 is polished. Then, in a step 504 a layer of photoresist 22 is coated onto the backside surface of the row of sliders 20. In a step 506 the photoresist layer 22 is photolithographically patterned to define a terminal pattern. Then, in a step 508 a reactive ion etching is performed with the photolithographically patterned photoresist in place.

Then, in a step 510, a terminal ground layer is deposited, preferably by method such as vapor deposition. In a step 512, a layer of electrically conductive material is deposited by electroless plating. The electrically conductive material is preferably gold (Au). Then, in a step 514 the photoresist is removed. Then, in a step 516 an air bearing surface topography is formed on the row of sliders 20. In a step 518 the rowbar can be cut into individual sliders.

Embodiment 3

Figure 6:
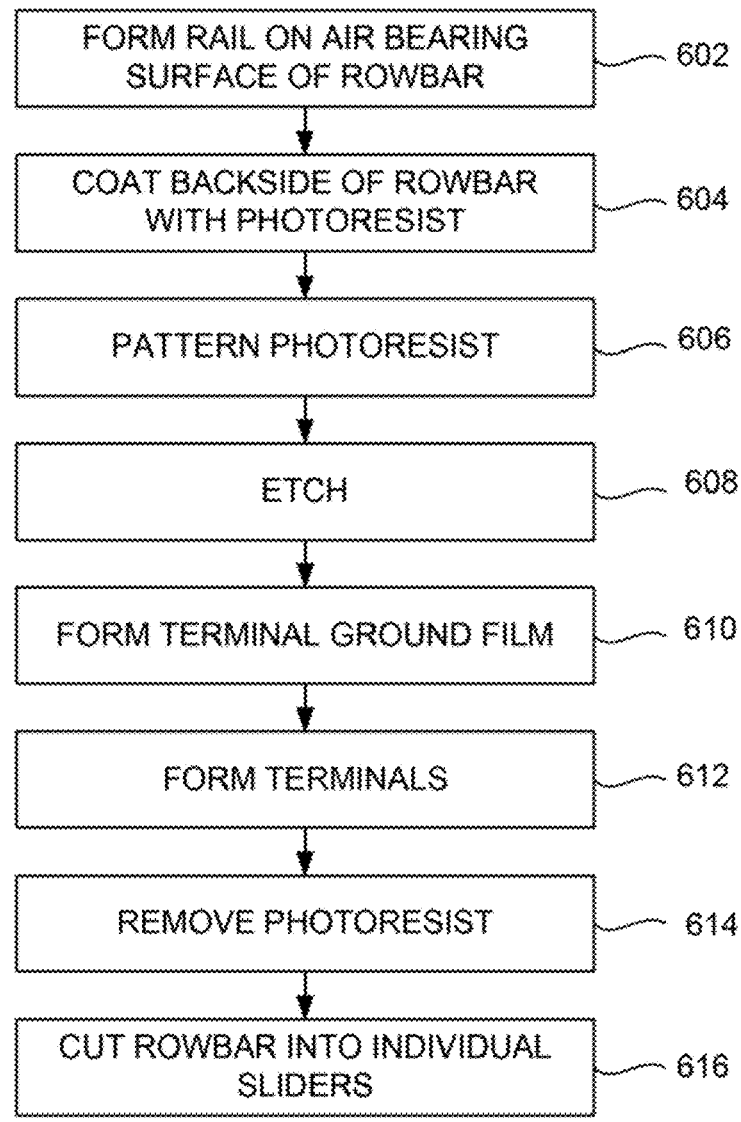

With reference now to FIGS. 12 and 13 and the flowchart of FIG. 6 a method of manufacturing a slider according to another embodiment of the invention is described. The reference numbers in the drawings indicate parts having the same reference numbers indicated in the above described embodiments. This example features forming the gold terminals 25 on the back surface of the row bar after forming the air-bearing surface rail 6 on the row bar. When the air-bearing surface topography is formed after the gold terminals 25 are formed on the back surface of the row bar as in working examples 1 and 2, a level difference develops between the row of sliders 20 of the row bar and the gold terminals 25. This embodiment is effective when there is degradation in the film thickness distribution and degradation in the position accuracy of the formation of the air-bearing surface rail 6, for example, when the resist was coated to form the air-bearing surface rail. In this embodiment, first, as shown in FIGS. 12A and 13A, the air-bearing surface rail 6 is formed by a photolithographic technique on the air-bearing surface 5 of the row bar. In this stage, gold terminals 25 are not formed on the back surface of the row bar, and the air-bearing surface topography 6 can be formed as when conventional techniques are used. The terminal pattern 23 is formed and etched similar to similar to the above described embodiment after forming the air-bearing surface rail 6 as shown in FIGS. 12B and 13B, the gold terminal ground film 24 is deposited and the resist 22 is removed as shown in FIGS. 12C and 13C. Electroless gold plating is applied to the top of the gold terminal ground film 24 as shown in FIGS. 12D and 13D to form the gold terminals 25. A similar method can be incorporated into the method of the first embodiment discussed above with reference to FIGS. 8 and 9.

The above process can be summarized with reference to the flowchart of FIG. 6. First, in a step 602 a rail or other air bearing surface topography is formed on the air bearing surface side of the row of sliders 20. Then, in a step 604 a layer of photoresist is coated onto the backside surface of the row of sliders 20. The photoresist is then patterned in a step 606 to form a terminal pattern. Then, in a step 608 an etching is performed, and in a step 610 a terminal ground layer is deposited. Then, in a step 612 an electrically conductive material (preferably Au) is deposited (preferably by electroless plating) to form the terminals. Then, in a step 614 the photoresist mask is lifted off. Finally, in a step 616 the slider row is cut into individual sliders.

Figure 7:
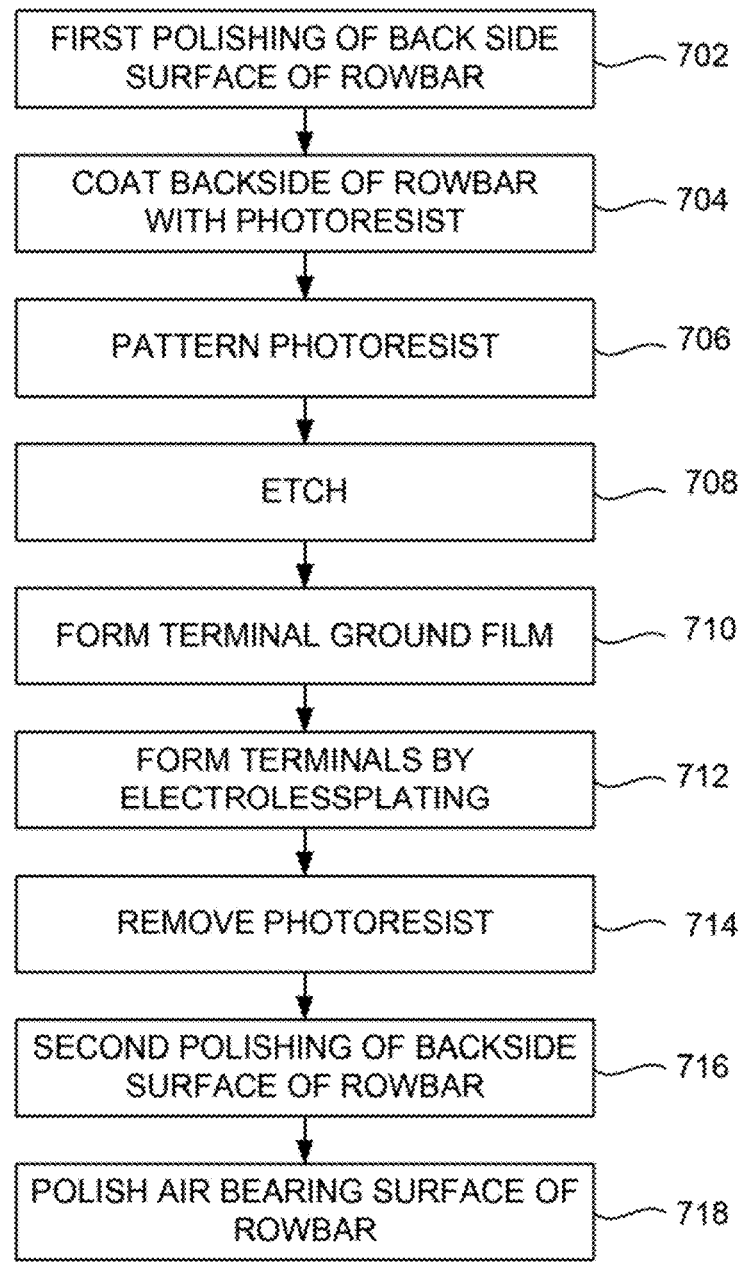
Figure 14A:
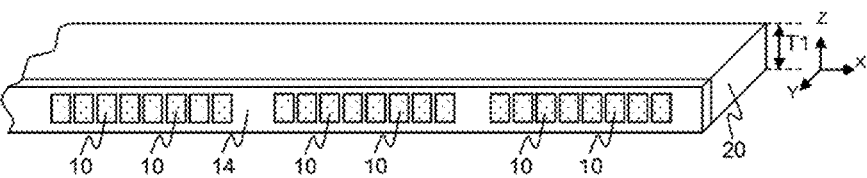
FIGS. 14A-14C and 15A-15C show a slider row in various intermediate stages of manufacture according to yet another embodiment of the invention.
Figure 14B:
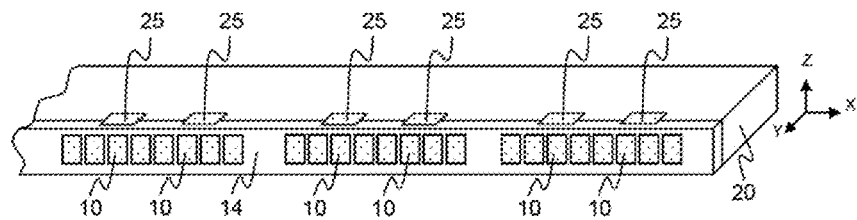
Figure 14C:
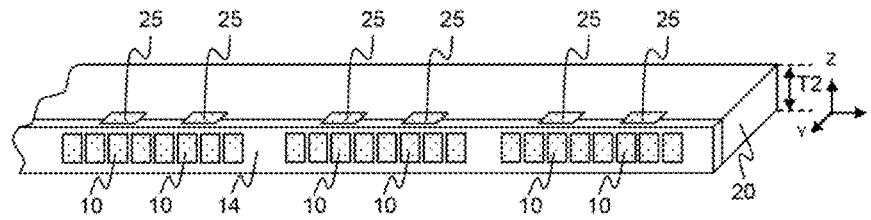
Figure 15A:
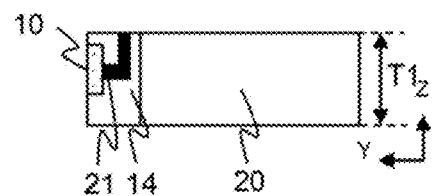
Figure 15B:
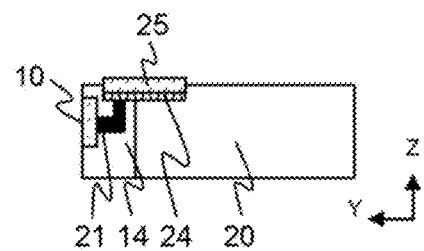
Figure 15C:
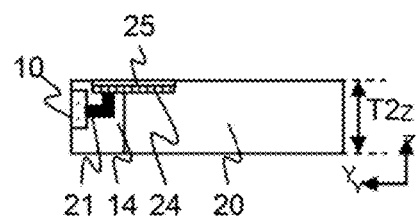

FIGS. 14 and 15 and the Flow chart of FIG. 7 illustrate a method for manufacturing a slider according to yet another embodiment of the invention. The reference numbers in the drawings indicate parts having the same reference numbers explained in the previously described embodiments. This example features performing the back surface polishing process of the row bar two times as shown as steps 702 and 716 of FIG. 7, and reducing the level difference between the slider 20 of the thermally-assisted magnetic recording head slider and the back surface gold terminals 25. As shown in FIGS. 14A and 15A, the thickness T1 of the row bar is polished to, for example, 250 μm in the initial back surface polishing process. Then the gold terminals 25 are formed by the methods described above. After the gold terminals 25 are formed, a level difference develops between the back surface gold terminals 25 and the slider 20. This working example is effective when this level difference causes degradation in the film thickness distribution or in the positional accuracy of the air-bearing surface rail 6 that was formed when the resist was coated. To eliminate the level difference, the thickness T2 of the row bar is polished to, for example, 230 μm as shown in FIGS. 14C and 15C. This can reduce the level difference between the back surface gold terminals 25 and the slider 20 and can reduce the effect described above in the post-process. The embodiment of this working example can also be implemented in working examples 1 and 2.

This third embodiment can be summarized with reference to the flowchart of FIG. 7. In a step 702 a first polishing of the backside surface of the row of sliders 20 is performed. Then, in a step 704 a layer of photoresist is coated onto the backside surface. In a step 706 the photoresist is patterned, and in a step 708 an etching is performed. Then, in a step 710 the terminal ground film is deposited. In a step 712 the terminals are formed (preferably of gold) and in a step 714 the photoresist is removed. Then, in a step 716 a second polishing of the backside surface is performed. Then, in a step 718 the air bearing surface (opposite the backside surface) is polished.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic recording slider, comprising:
a slider body having an air bearing surface a backside surface opposite the air bearing surface and a trailing edge surface;
a head formed on the trailing edge surface, the head having a trailing edge surface and a backside surface;
an electrically conductive first terminal formed on the trailing edge surface of the head;
an electrically conductive second terminal formed on the backside surface of the head and the backside surface of the slider body; and
an electrical lead formed entirely within the head and connecting the electrically conductive first terminal with the electrically conductive second terminal.

2. The magnetic recording slide as in claim 1, further comprising a laser light source mounted to the back side surface of the slider and electrically connected with the electrically conductive second terminal.

3. The magnetic recording slider as in claim 2, wherein the light source is a laser diode.

4. The magnetic recording slider as in claim 1, wherein the electrically conductive second terminal is at least partially embedded within the slider body and the head.

5. The magnetic recording slider as in claim 1, wherein electrically conductive first and second terminals comprise Au.

6. The magnetic recording slider as in claim 1, wherein the electrically conductive second terminal further comprises an electrically conductive ground layer and a layer of Au formed on the electrically conductive ground layer.

7. The magnetic recording slider as in claim 6, wherein the electrically conductive ground layer comprises one or more of Cr, NiFe and Au.

8. The magnetic recording slider as in claim 1, wherein the electrically conductive lead comprises one or more of Au, Ag, Cu and NiFe.

9. The magnetic recording slider as in claim 1, wherein the electrically conductive second terminal is flush with the backside surface of the slider body.

10. The magnetic recording slider as in claim 1, wherein the electrically conductive second terminal extends above the backside surface of the slider body.

11. A method for manufacturing a magnetic recording slider, comprising;
forming a slider row having a backside surface and having a recording head formed on a trailing edge surface of the slider row, the recording head having a trailing edge surface and a backside surface, and having an electrically conductive first terminal formed on the trailing edge surface of the recording head, and having an electrical lead line connected with the first terminal and extending through the recording head to the back side surface of the recording head wherein the lead is entirely formed within the recording head;
forming a photoresist mask on the backside surfaces of the slider body and recording head, the photoresist being formed with an opening configured to define a second terminal pattern that extends over a portion of the slider body and a portion of the recording head; and
depositing an electrically conductive material to form a second terminal on the backside surfaces of the slider body and recording head.

12. The method as in claim 11, further comprising after forming the photoresist mask and before depositing the electrically conductive material, performing an etching.

13. The method as in claim 11, wherein the deposition of the magnetic material to form the second terminal further comprises depositing an electrically conductive ground layer and electroplating an electrically conductive material over the electrically conductive ground layer.

14. The method as in claim 11, wherein the deposition of the magnetic material to form the second terminal further comprises depositing an electrically conductive ground layer and performing an electroless plating of an electrically conductive material over the electrically conductive ground layer.

15. The method as in claim 13, wherein the material deposited by electroplating comprises Au.

16. The method as in claim 14, wherein the material deposited by electroless plating comprises Au.

17. The method as in claim 11, wherein the etching comprises reactive ion etching.

18. The method as in claim 11, wherein the etching comprises wet etching.

19. The method as in claim 11, wherein the etching forms a recess in the backside surface of the slider body and the backside surface of the head and wherein the second terminal is formed at least partially within the recess.

20. The method as in claim 11, further comprising, after forming the second terminal, polishing the backside surfaces of the slider body and the recording head.

21. The method as in claim 11, wherein the slider body has an air bearing surface opposite the backside surface, the method further comprising, before forming the photoresist mask, polishing the air bearing surface of the slider body.

* * * * *